Aug. 15, 1933.　　　　S. BOGUT　　　　1,922,417
AUTOMATIC AIR BRAKE RELEASE VALVE
Filed March 31, 1930
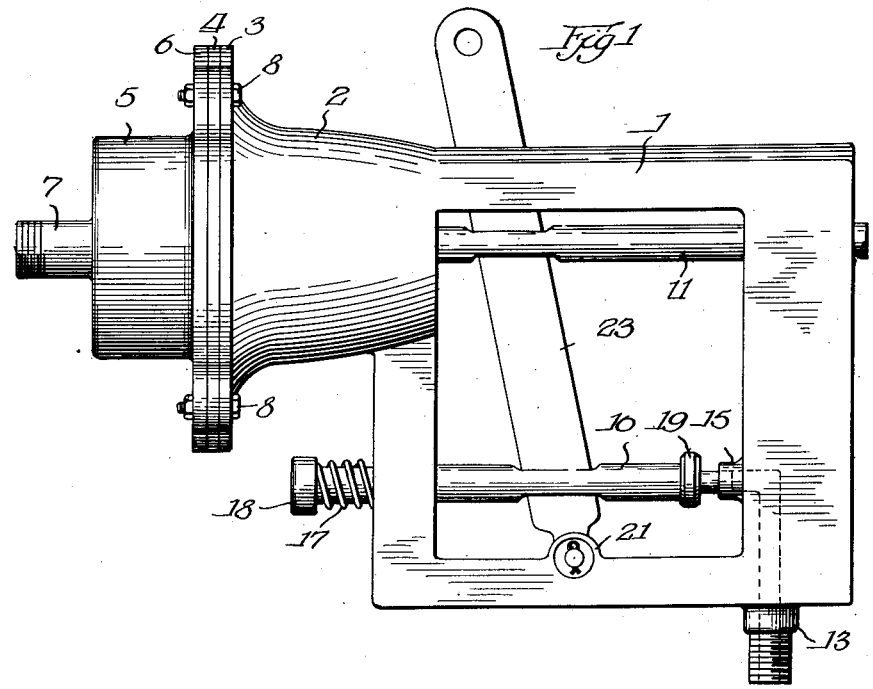
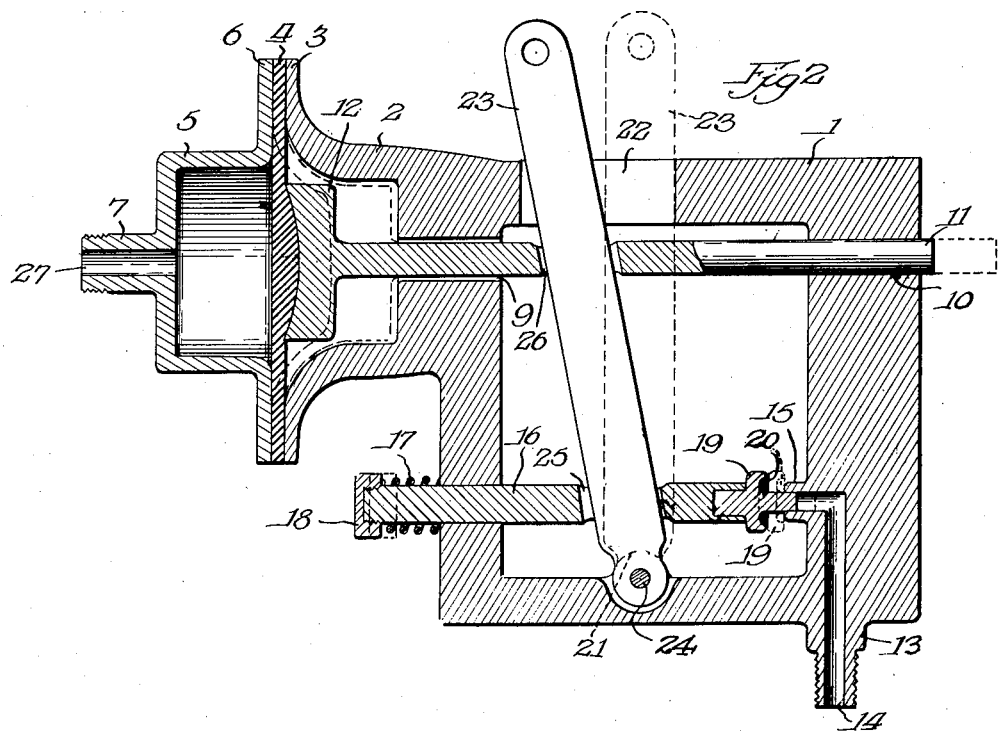
Witness:
R. B. Darrow.
Inventor:
Stanley Bogut
By John F. Brezina
Atty Patented Aug. 15, 1933

1,922,417

UNITED STATES PATENT OFFICE 1,922,417

AUTOMATIC AIR BRAKE RELEASE VALVE

Stanley Bogut, Chicago, Ill.

Application March 31, 1930. Serial No. 440,291

6 Claims. (Cl. 303—80)

My invention relates to an automatic air brake release valve for use in connection with standard air brake equipment as used on railway freight and passenger cars. The standard air brake systems on the cars of a train are controlled from the locomotive, but when the cars are switched on a siding and the brakes are applied, the locomotive and interconnecting air hose are disconnected and the three-way valve of the standard air brake is in a position to hold compressed air in the auxiliary reservoir and in the brake actuating cylinder to hold the brakes in locked position. The standard air brake equipment includes an auxiliary air outlet valve on the air reservoir tank under the center of the car and this valve can only be opened by the manual actuation of an iron rod connected to said valve and extending on each side of the car. My invention eliminates the necessity for the brakeman to go from one car to another and open the air outlet valve to release the brakes.

An important object of my invention is the provision of an automatic release valve for air brake systems which will obviate the necessity of manually opening the air release valve on each car when the cars are not connected to a locomotive.

A further important object of this invention is the provision of a compact and practical self-actuating mechanism in the compressed air circuit of a standard air brake system which will automatically release the brakes on the car by opening the release valve to release the brake actuating piston from locking position.

A further important object of my invention is the provision of an air valve and mechanism to operate the same which is adapted to be held in closed position when the air circuit in the train line is unobstructed, and which mechanism will operate automatically when the air pressure is reduced and broken in the train line to open a valve to release the compressed air from the auxiliary reservoir.

Other and further important objects of this invention will be apparent from the disclosures in the specification and the accompanying drawing.

This invention (in a preferred form) is illustrated in the drawing and hereinafter more fully described.

On the drawing:

Fig. 1 is a side elevational view of my automatic air brake release valve.

Fig. 2 is a view thereof taken in cross section.

As shown on the drawing:

The reference numeral 1 indicates a square shaped metal frame which has a forward flaring bell shaped portion comprising a cylinder 2, said portion terminating in a circumferential flange 3 which has apertures (not shown) for the reception of bolts 8. A circular housing 5 having an annular flange 6 corresponding in size to flange 3 and also having a threaded nozzle 7 secured a flexible rubber diaphragm 4 firmly between flanges 6 and 3 by means of bolts 8 passing thru apertures in said flanges and said diaphragm. The diaphragm 4 is preferably convex on its "cylinder" side for a purpose which will appear hereinafter.

An opening 27 extends from within the housing 5 thru nozzle 7 which is normally connected to the main train air line and circuit, the source of which is a standard air pump on the locomotive. In opposite sides of the frame 1 and in the same plane are holes 9 and 10 in which a rod 11 is adapted to slide. Said rod 11 carries a head 12 which fits in the cylinder 2 and has a concave face adjacent the convex side of the rubber diaphragm 4.

Projecting downwardly from the lower portion of the frame 1 is an externally threaded stud 13 which is adapted to be connected to the air reservoir of a standard air brake unit, said stud forming an outlet thru passageway 14 extending therethru and thru a portion of frame 1 and terminating in the center of a bushing 15 formed integral with the frame 1 as shown. A shaft 16 is adapted to slide in an aperture in the frame 1 and has one end protruding outside said frame 1 about which is a coil spring 17 held in position by a cap 18. The other end of shaft 16 is bored out for the reception of one arm of a valve 19, the opposite leg of which is adapted to slide in the bushing 15. Valve 19 is circular in shape and has an annular concave surface adapted to hold a rubber seating ring 20 which contacts the annular periphery of flange 15 when the valve 19 is in closed position.

The frame 1 has an apertured integral ear 21 extending upwardly from its lower side and a vertical slot 22 in its upper side. A lever 23 having holes at each end has its lower end pivoted to ear 21 by means of pin 24 which is held in place by a cotter pin or the like. The lever 23 passes thru a slot in shaft 16, thru a slot 26 in piston rod 11 and also thru vertical slot 22 in the frame 1 and projects a short distance thereabove. Said projecting end may be used when it is desired to manually test the operation of the device.

Nozzle 7 of the housing 5 is connected to the main train compressed air line in which an air pressure of approximately 70 pounds is maintained while the train is in motion. Like air pressure is maintained in housing 5, which presses against elastic diaphragm 4 and holds piston 12 in dotted line position shown in Fig. 2 thereby firmly holding valve 19 closed.

This position of piston 12 and valve 19 is maintained when the brake system is in operation due to the air pressure in housing 5, valve 19 being closed to prevent outflow from the auxiliary reservoir.

When a car is cut out of the train, the trainman sets the cut-out cocks usually provided in the air braking system between the train line and the triple valve so that, if the brakes have been released, the air pressure will be maintained so that the brakes will not be applied. However, due to the unavoidable air leakage in the cut-out cock, the brakes will be applied by the pressure in the auxiliary reservoir and maintained in braking engagement as long as the pressure is maintained in the auxiliary air reservoir.

Where the pressure in the train line is reduced the spring will open valve 19 and retract piston 12 to the position shown in Fig. 2, thereby bleeding the auxiliary reservoir to reduce the pressure in the latter and release the brakes, thereby eliminating the necessity for the trainman to remain at the car during the bleeding operation.

Where air is admitted to the train line and into housing 5, the diaphragm 4 and piston 12 is immediately forced to the right to quickly close valve 19, after which normal braking air pressure will be maintained in the air auxiliary reservoir for use as hereinbefore described.

When it is desired to move the cars, it is only necessary to open the valve of the main train line on the end car of the train which action will release all air from said train line and from housing 5, whereupon the action of coil spring 17 will cause piston 12 and lever 23 to move to the position shown in Fig. 2 to open valve 19, thereby releasing the air from the auxiliary reservoir. When said air is released the piston and brake-locking levers connected thereto will return to normal released position.

It will be apparent from the foregoing that my device eliminates the necessity of manual release of the compressed air from the auxiliary reservoir of each car when it is desired to release the brakes from brake-locking position, and the brakeman is saved the time and effort of walking from car to car to make such release.

As soon as the locomotive is coupled to the car or cars, the train line is refilled from the air compressor and tank on the locomotive whereupon valve 19 is again closed and the auxiliary reservoir recharged to normal train pipe pressure.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A device of the class described comprising a frame having a passageway therethrough normally connected to the auxiliary reservoir of an air brake equipment; a valve in said passageway; a lever pivoted on said frame and adapted when moved to open or close said valve; a bell-shaped member integral with said frame; a rod slidable in said frame and terminating in an enlarged head portion within said bell-shaped member; a flexible diaphragm secured over the opening of said bell shaped member, and a metal housing secured against said diaphragm and normally connected to a compressed air source, the admission of compressed air thereinto being adapted to effect movement of said rod and closing of said valve.

2. A device of the class described comprising a frame having a passage therethrough connected to the auxiliary reservoir of an air braking equipment; a bleeder valve in the outlet of said passage; an outwardly extending member formed integral with said frame; a flexible diaphragm secured on said member; a rod slidably mounted in said frame and having one end abutting said diaphragm; means on said frame whereby movement of said rod will open or close said valve; and a housing mounted over said diaphragm and having an inlet port whereby compressed air admitted thereinto will bend said diaphragm to slide said rod to close said valve.

3. A device of the class described comprising a frame having a passageway therethrough normally connected to the auxiliary reservoir of an air bake equipment; a valve in said passageway; a lever pivoted on said frame and adapted when moved to open or close said valve; a bell shaped member integral with said frame; a rod slidable in said frame and terminating in an enlarged head portion within said bell shaped member, and means adapated to hold said valve in open position when air pressure on both sides of said diaphragm is equal.

4. A device of the class described comprising a frame having an air passageway therethrough normally communicating with the auxiliary reservoir of an air brake equipment; a valve in said passageway; a mounting member formed integral with said frame; a flexible diaphragm having its periphery secured to said member; an air chamber housing secured over said diaphragm and communicating with a source of compressed air; a rod slidably mounted in said frame with one end adjacent said diaphragm, and means on said frame adapted to transmit movement of said rod to close said valve.

5. A device of the class described comprising a frame having an air passageway therethrough normally communicating with the auxiliary reservoir of an air brake equipment; a valve in said passageway; a mounting member formed integral with said frame; a flexible diaphragm having its periphery secured to said member; an air chamber housing secured over said diaphragm and communicating with a source of compressed air; a rod slidably mounted in said frame having one end adjacent said diaphragm; a shaft slidable in said frame and engaging said valve; a lever pivoted on said frame and engaging said rod and said shaft to effect closing of said valve, and means to hold said valve and connected parts in open position when the air pressure on opposite sides of said diaphragm are equal.

6. A device of the class descibed comprising a frame having an outlet port adapted to be connected to the auxiliary reservoir of an air brake equipment, said frame having a bell shaped portion; a bleeder valve in said outlet port; a head slidable in the bell shaped portion of said frame; a rod integral with said piston and slidably mounted in said frame; means actuable by said rod to open and close said valve; a flexible diaphragm secured over said bell shaped frame portion; a housing secured on the outer side of said diaphragm and connected to a compressed air source, the admission of air thereinto being adapted to actuate said rod to close said valve.

STANLEY BOGUT.